(12) United States Patent
Green

(10) Patent No.: US 11,363,762 B2
(45) Date of Patent: Jun. 21, 2022

(54) FABRIC POT

(71) Applicant: HydroGarden Ltd, Coventry (GB)

(72) Inventor: Stuart Green, Coventry (GB)

(73) Assignee: HYDROGARDEN LTD, Coventry (GB)

(*) Notice: Subject to any disclaimer, the term of this patent is extended or adjusted under 35 U.S.C. 154(b) by 121 days.

(21) Appl. No.: 16/566,968

(22) Filed: Sep. 11, 2019

(65) Prior Publication Data
US 2020/0077599 A1    Mar. 12, 2020

(30) Foreign Application Priority Data
Sep. 11, 2018 (GB) ...................................... 1814769

(51) Int. Cl.
*A01G 9/029*    (2018.01)

(52) U.S. Cl.
CPC .................. *A01G 9/0291* (2018.02)

(58) Field of Classification Search
CPC .. A01G 9/0291; A01G 9/00; A01G 2009/003; A01G 9/02; A01G 9/021; A01G 9/028; A45C 2003/002; A45C 3/045; B65D 33/00; B65D 33/01
See application file for complete search history.

(56) References Cited

U.S. PATENT DOCUMENTS

| | | | | |
|---|---|---|---|---|
| 2,253,688 A | * | 8/1941 | Collins | A01K 97/04 43/55 |
| 5,092,682 A | * | 3/1992 | Fenick | A47K 3/281 383/102 |
| 5,401,101 A | * | 3/1995 | Wang | A45C 3/045 383/117 |
| 6,173,531 B1 | * | 1/2001 | Howell | A01G 9/0291 47/73 |
| 6,186,662 B1 | * | 2/2001 | Jackson | A45C 3/00 383/117 |
| 9,107,350 B2 | * | 8/2015 | Shields | A01M 29/30 |
| 10,945,501 B2 | * | 3/2021 | Gonzalez | A45C 3/045 |
| 2006/0005466 A1 | * | 1/2006 | Atchley | A01G 9/024 47/39 |
| 2006/0026897 A1 | * | 2/2006 | Glover | A01G 9/02 47/65.8 |
| 2007/0157513 A1 | | 7/2007 | Varney et al. | |
| 2008/0190021 A1 | | 8/2008 | Marks | |

FOREIGN PATENT DOCUMENTS

| | | | | |
|---|---|---|---|---|
| CN | 102652489 | * | 9/2012 | ............ A01G 25/02 |
| CN | 102652489 A | | 9/2012 | |
| ES | 2029658 A6 | | 8/1992 | |

OTHER PUBLICATIONS

Chen; Chen translation; 2012, retrieved from EPO website Jun. 4, 2021 (Year: 2012).*
European Search Report issued in UK Application No. GB1814769. 4, dated Feb. 14, 2020, pp. 1-5.

* cited by examiner

*Primary Examiner* — Kristen C Hayes
(74) *Attorney, Agent, or Firm* — Tutunjian & Bitetto, P.C.

(57) ABSTRACT

A fabric pot for growing media having a base and an upstanding side wall. The side wall has a lower section made from a porous fabric material and an upper section being made from a waterproof material layer.

8 Claims, 3 Drawing Sheets

FABRIC POT

FIELD OF INVENTION

The present invention relates to a fabric pot. More especially the invention relates to fabric pot for growing plants, herbs and the like.

BACKGROUND TO THE INVENTION

Fabric pots are known. They are generally placed into soil in the ground or within trays. The pots are made entirely from a fabric material that is porous to allow moisture to flow through the walls of the fabric to provide irrigation whilst the structure of the pot contains the roots to prevent excess spreading.

Whilst known fabric pots work well and have proven to be popular, they suffer from a number of disadvantages which cause them to have inefficient irrigation leading the user to use more water than necessary and to have to water the growing media more regularly.

A problem associated with known fabric pots when used in soil will now be described with reference to FIG. 1.

When planting a fabric pot in the ground in conditions where the surrounding soil is dry, water fed into the pot will quickly disperse through the fabric into the dry soil surrounding the outside of the pot. Consequently, water fed into the top of the pot is directed out of the walls of the pot before it can reach the base of the pot and lower roots of the plant. As a result, a considerable proportion of the irrigated water is wasted through it being dispersed into the surrounding soil, causing the plant growing media to dry out quicker and for it to need regular or continual replenishment. Consequently, the growing media requires more water, more often, than would be the case if the pot provided efficient irrigation.

The present invention seeks to alleviate the aforementioned problem by preventing disbursement of moisture out of the pot at its top section to allow sufficient moisture to reach the base and the lower roots of the plant.

Referring now to FIG. 2, a similar problem occurs in the case where known fabric pots are used in a tray.

As the top of the pot has a large surface area, evaporation causes the top third of the pot to dry out quicker than the remaining two-thirds of the pot. Moisture from the bottom of the pot is pulled upwards to the drier region causing rapidly changing soil conditions in the top section which discourages root growth in that section.

The present invention also seeks to alleviate this problem by stabilising moisture levels within the top section of the pot to encourage root growth in that section and throughout the pot.

STATEMENTS OF INVENTION

According to a first aspect there is provided a fabric pot for growing media comprising a base and an upstanding side wall, the side wall having a lower section made from a porous fabric material and an upper section being made from, or having located thereon, a waterproof material layer.

Preferably the base and lower section of the side wall are made from porous fabric material.

Preferably the fabric section is approximately two thirds to half of the height of the wall.

Preferably the lower edge of the water proof layer is stitched to the upper edge of the fabric layer.

Preferably the upper edge of the water proof layer includes a gastropod repellent band. Preferably the band is impregnated with copper or salt.

BRIEF DESCRIPTION OF DRAWINGS

One embodiment of the invention will now be described by way of example with reference to the accompanying figures in which.

DETAILED DESCRIPTION OF A PREFERRED EMBODIMENT

Figure 1:
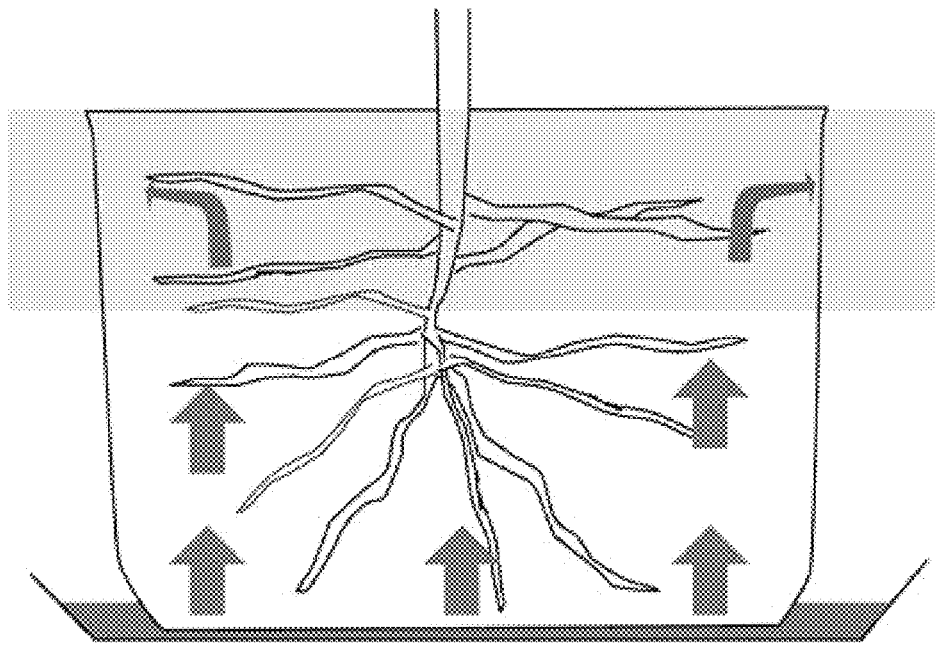
FIG. 1 is a diagram showing the water flow through a prior art fabric pot placed in the ground.
Figure 2:
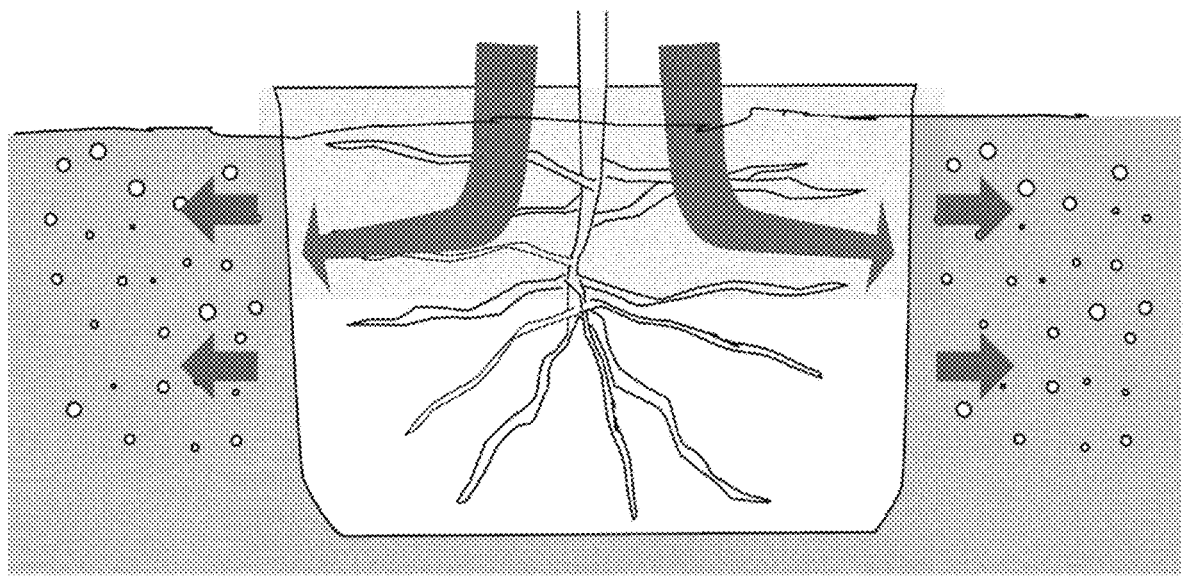
FIG. 2 is a diagram showing the water flow through a prior art fabric pot placed in a tray.
Figure 3:
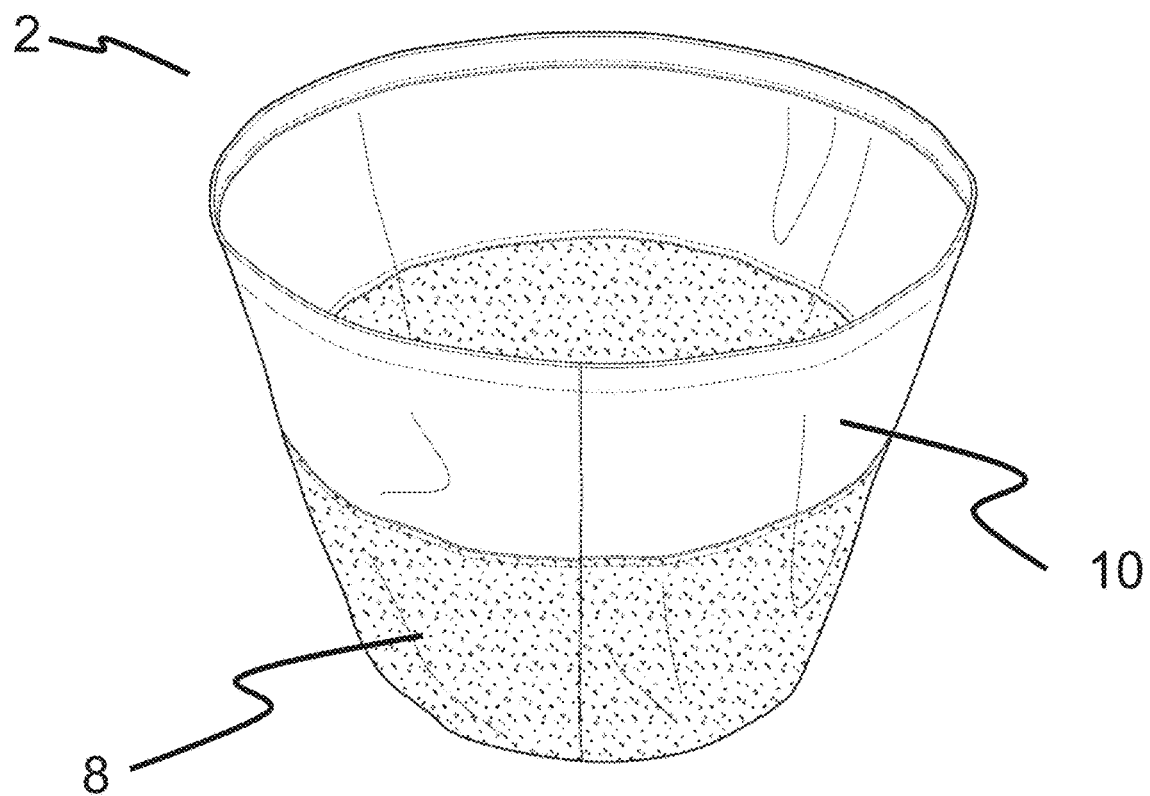
FIG. 3 is perspective view of a fabric pot of a first shape constructed in accordance with the invention.
Figure 4:
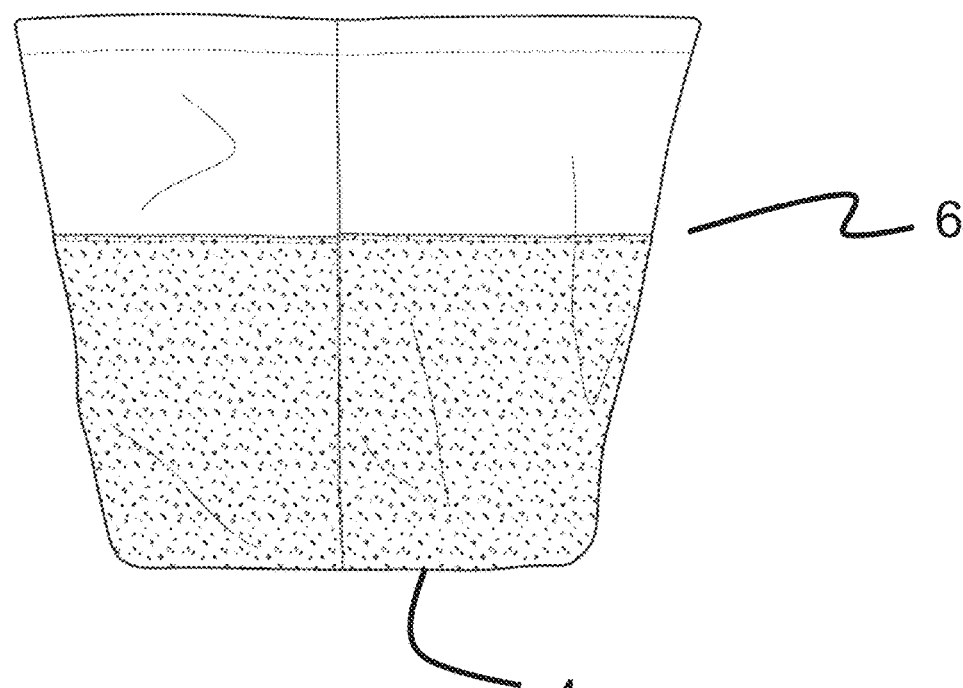
FIG. 4 is a side view of the pot of FIG. 1.
Figure 5:
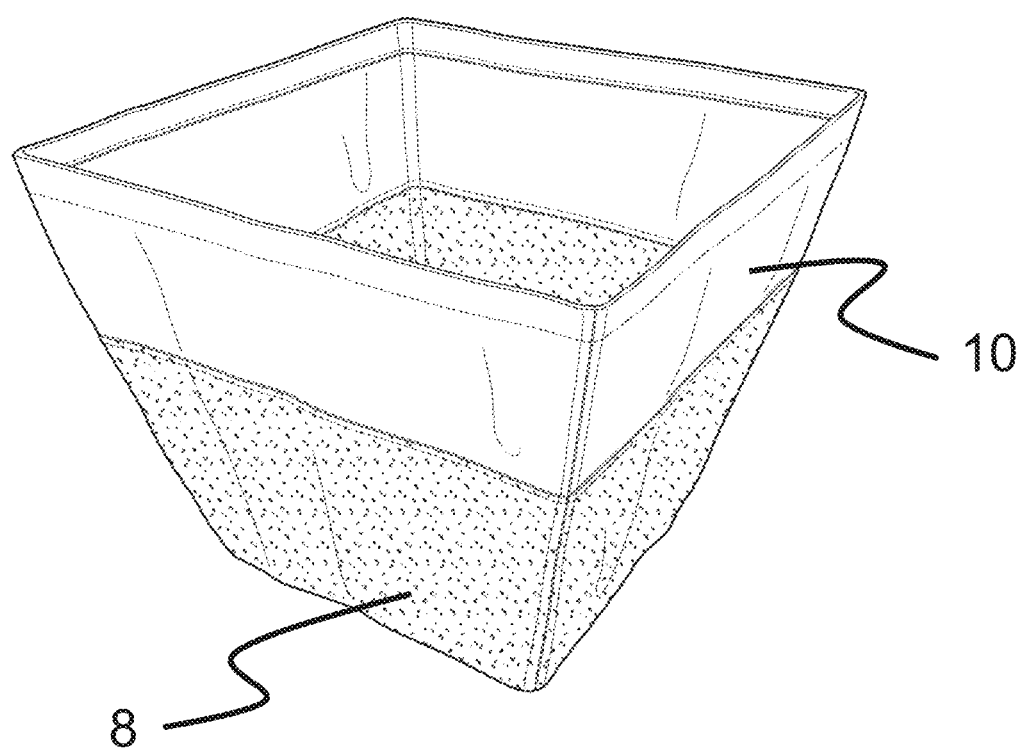
FIG. 5 is a perspective view of a fabric pot of a second shape constructed in accordance with the invention.

FIGS. 3 to 5 show a fabric pot 2 in accordance with the invention. The only difference between FIGS. 1 and 3 is the overall shape of the pot and the description below is applicable to either of the illustrated pot designs. The pot of FIG. 3 has a circular design (cross-section) whereas the pot of FIG. 4 has a square design. It will be appreciated that the pot could be a different shape to those illustrated.

The pot 2 comprises a base 4 with an upstanding side wall 6. The side wall 6 may be formed as a single piece or may be provided in sections stitched together. The sections may be attached in other ways, for example they may be bonded or adhered together. The top of the pot 2 is open.

The side wall 6 is formed with a lower section 8 and an upper section 10. The base 4 and lower section 8 are formed with a single piece of porous fabric material. The porosity of the fabric allows irrigated water to travel through the growing media and out of the lower section 8 and base 4 to the surrounding environment. The fabric material also allows for air pruning.

The side wall 6 and base 4 may alternatively be provided as two separate pieces of fabric material stitched, bonded or adhered together, for example.

The side wall 6 and base 4 may be made from a non-fibrous or non-fabric material provided the material has a porosity to allow show of irrigated water through it and to allow air pruning.

The upper section 10 of the side wall is formed of a waterproof material which, in contrast to the base 4 and lower section 8, does not allow moisture to pass through to the surrounding environment in the upper section 10. This ensures that water introduced into the pot 2 is directed downwardly to the base 4 and lower section 8 before dispersing to the outside thereby ensuring that the growing media at the bottom of the pot 2 receives sufficient moisture to feed the lower roots of a plant growing in the pot.

The lower edge of the waterproof section 10 is stitched to the upper edge of the fabric section 8.

In an alternative embodiment, the entire pot may be formed of a fabric material but includes a waterproof layer around the periphery of the top section. A waterproof strip or ring may, for example, be stitched bonded or adhered, onto the inside or outside of the fabric, or may be located within the fabric.

The upper section 10 has a height of approximately one third of the total height of the side wall of the pot, the remaining two-thirds being formed of the fabric material.

The upper section may have a height of approximately half the total height of the side wall of the pot.

The upper edge of the upper section 10 may include a snug/snail repellent band around its periphery. The band may, for example, be impregnated with copper or salt.

It will be appreciated that the foregoing is merely an example of an embodiment and just some examples of its use. The skilled reader will readily understand that modifications can be made thereto without departing from the true scope of the invention.

The invention claimed is:

1. A fabric pot for growing media comprising:
   a base made of a porous fabric material; and
   an upstanding side wall extending upwardly from the base, the upstanding side wall having a height, a lower section made from the porous fabric material and an upper section made from, or having located thereon, a waterproof material layer, wherein the porous fabric material of the lower section is approximately two thirds to half the height of the upstanding side wall.

2. The fabric pot according to claim 1, wherein a lower edge of the waterproof material layer is stitched to an upper edge of the porous fabric material.

3. The fabric pot according to claim 1, wherein an upper edge of the waterproof layer includes a gastropod repellent band.

4. The fabric pot according to claim 3, wherein the gastropod repellent band is impregnated with copper or salt.

5. A fabric pot for growing media comprising:
   a base; and
   an upstanding side wall extending upwardly from the base and having a height, a lower section and an upper section, the lower section is made from a porous fabric material and the upper section is made from, or has located thereon, a waterproof material layer, wherein an upper edge of the waterproof material layer includes a gastropod repellent band.

6. The fabric pot according to claim 5, wherein the gastropod repellent band is impregnated with copper or salt.

7. The fabric pot according to claim 5, wherein the lower section is half the height of the upstanding side wall.

8. The fabric pot according to claim 5, wherein the lower section is two-thirds the height of the upstanding side wall.

* * * * *